US008739051B2

(12) United States Patent
Green (10) Patent No.: US 8,739,051 B2
(45) Date of Patent: May 27, 2014

(54) GRAPHICAL REPRESENTATION OF ELEMENTS BASED ON MULTIPLE ATTRIBUTES

(75) Inventor: James Anthony Green, San Jose, CA (US)

(73) Assignee: Apple Inc., Cupertino, CA (US)

( * ) Notice: Subject to any disclaimer, the term of this patent is extended or adjusted under 35 U.S.C. 154(b) by 780 days.

(21) Appl. No.: 12/398,068

(22) Filed: Mar. 4, 2009

(65) Prior Publication Data

US 2010/0229124 A1    Sep. 9, 2010

(51) Int. Cl.
*G06F 3/0481* (2013.01)
(52) U.S. Cl.
CPC .................................. *G06F 3/04812* (2013.01)
USPC ............ 715/767; 715/810; 715/835; 715/846
(58) Field of Classification Search
CPC   G06F 3/04812; G06F 3/04817; G06F 3/0482
USPC ......................................................... 715/767
See application file for complete search history.

(56) References Cited

U.S. PATENT DOCUMENTS

| 5,861,886 | A |   | 1/1999  | Moran et al. |
|-----------|---|---|---------|--------------|
| 6,070,176 | A | * | 5/2000  | Downs et al. ................. 715/234 |
| 6,775,659 | B2 |  | 8/2004  | Clifton-Bligh |
| 7,191,175 | B2 |  | 3/2007  | Evans |
| 7,627,831 | B2 | * | 12/2009 | Chiu et al. ..................... 715/767 |
| 8,108,789 | B2 | * | 1/2012  | Fujii et al. ..................... 715/769 |
| 2006/0101102 | A1 |  | 5/2006 | Su et al. |
| 2008/0016467 | A1 |  | 1/2008 | Chambers et al. |
| 2008/0282190 | A1 | * | 11/2008 | Kagaya .......................... 715/794 |
| 2010/0169782 | A1 | * | 7/2010 | Chatani et al. ................. 715/730 |

OTHER PUBLICATIONS

Olsen et al, "Visualization of a Document Collection: The VIBE System," Feb. 1993, Pergamon Press, Inc., Information Processing and Management: an International Journal, vol. 29 Issue 1, Jan.-Feb. 1993.*

* cited by examiner

*Primary Examiner* — Alvin Tan
(74) *Attorney, Agent, or Firm* — Kilpatrick Townsend & Stockton LLP (57) ABSTRACT

Systems, methods and machine-readable media are disclosed for providing a graphical representation of elements, such as songs. Each element may be associated with at least one of multiple attributes. For each of the elements, a degree of relevancy can be computed with respect to each of the attributes. A graphic representing each attribute can be displayed on a display screen, and the elements can be displayed on the display screen such that they are spatially positioned relative to the graphics based on the computed relevancies. In some embodiments, a region can be defined for each of the attributes, and the elements associated with a particular attribute may be displayed within the associated region.

18 Claims, 8 Drawing Sheets

GRAPHICAL REPRESENTATION OF ELEMENTS BASED ON MULTIPLE ATTRIBUTES

FIELD OF THE INVENTION

This is directed to an application for providing a graphical representation of elements, such as songs or electronic files, based on multiple attributes.

BACKGROUND OF THE DISCLOSURE

Today's electronic devices, such as desktop computers and portable music players, have large storage capabilities. Users can therefore maintain large collections of music and other types of electronic files, such as pictures, videos, spreadsheets, and text-files, on their electronic devices. These large collections often contain songs or files with a variety of different attributes (e.g., songs with different genres and from different eras or documents with different edit dates and stored in different folders).

Current electronic devices, however, are limited in their ability to present information about these collections to users in a useful way. For example, for music collections, current electronic devices might be limited in the manner which song options or song recommendations are provided. One approach used by current electronic devices is to allow the user to select one particular song from his or her music collection. In response, the electronic device presents a text-based list of other songs in the user's music collection that are similar or related to the song. Another approach used by current electronic devices is to provide a text-based menu that allows a user to filter songs based on a particular attribute, such as by genre.

SUMMARY OF THE DISCLOSURE

Systems, methods, and machine-readable media are disclosed for providing a graphical representation of elements (e.g., songs) on the display screen of an electronic device. The elements can be associated with multiple attributes, where each individual element may be associated with one or more of the attributes. The elements can be distributed in the graphical representation based on their respective attributes. For music elements, the attributes may be, for example, the genre, artist, album, date of release, date of acquisition or purchase, song speed, lyrics, vocals, bass line, producers, song writers, song tags, or keywords associated with a particular song. A song tag, for example, can include any metadata that provides information about the song.

In some embodiments, the user can for example select the attributes from an electronic device, and the electronic device can use these initial parameters to identify the elements. Optionally, to select each attribute, the user can choose a song of current interest from the user's music collection. The user then can identify the reason (and therefore the attribute) for why the user enjoys listening to the song or why the song is currently of interest.

In some embodiments, as part of the graphical representation of elements, the electronic device can display multiple graphics that each represent one of the attributes. For example, each graphic can be a box-shaped object located near the edge or corner of the display screen. The electronic device can compute, for each of the elements, a degree of relevancy of that element with respect to one or more of the attributes. The "degree of relevancy" of a particular element with respect to a particular attribute can refer to a non-binary measure of how compatible with or similar a particular element is to the particular attribute. In some embodiments, for example, the electronic device can compute the degree of relevancy of a first element (which is associated with a first one of the attributes) with respect to a second attribute to determine whether this first element is highly compatible with both attributes or with just the first attribute. The electronic device can perform similar computations for the remaining elements. In other embodiments, the electronic device can compute a binary measure of how compatible or similar with each element is to the other elements.

Using the computed degrees of relevancy or the binary measure, the electronic device may display the elements on the display screen. In some embodiments, the electronic device can spatially position each element on the display screen relative to the graphics based on the computed degrees of relevancy or the binary measure. For example, the electronic device can compute a weight for each element that is indicative of the element's compatibility with other attributes, and can display the higher-weight elements further from a corresponding graphic (e.g., near the center of the display screen) and lower-weight elements closer to a corresponding graphic (e.g., near the edge of the display screen). This way, higher-weight elements which may be more compatible with all of the attributes can be displayed in a more prominent, central position of the display screen. In some embodiments, the electronic device can highlight the highest-weight elements (e.g., elements with weights within a predetermined range) to further distinguish these elements from the lower-weight elements.

In some embodiments of the invention, the electronic device can provide regions in which the elements are displayed. For example, for two-attribute graphical representations, the electronic device can define a first region in which a first group of elements associated with a first attribute can be displayed. The electronic device can also define a second region in which a second group of elements associated with a second attribute can be displayed. For each of the elements in the first group, the electronic device can determine a degree of relevancy of the element with respect to the second attribute. This allows the electronic device to determine whether the elements associated with the first attribute are also compatible or related to the second attribute. Likewise, for each of the elements in the second group, the electronic device can determine a degree of relevancy of the element with respect to the first attribute. This allows the electronic device to determine whether the elements associated with the second attribute are also compatible with or related to the first attribute.

The electronic device can display the first and second group of elements in their respective first and second regions based on the determined degrees of relevancy. For example, elements in the first group that have a higher degree of relevancy (and are therefore more compatible with the second attribute) can be displayed closer to the second region than those with lower degrees of relevancy. Elements in the second group that have a higher degree of relevancy (and are therefore more compatible with the first attribute) can be displayed closer to the first region than those with lower degrees of relevancy. Accordingly, the elements that are most compatible with both attributes can be clustered together, and a user can look to one part of the screen (e.g., the center of the screen) to view elements that are associated with both attributes.

The electronic device can generate graphical representations using any number of attributes, and not just two. For example, the electronic device can provide three regions for three groups of elements if three attributes are selected by the user.

BRIEF DESCRIPTION OF THE DRAWINGS

The above and other aspects and advantages of the present invention will be apparent upon consideration of the following detailed description, taken in conjunction with accompanying drawings, in which like reference characters refer to like parts throughout, and in which.

DETAILED DESCRIPTION

Systems, methods, and machine-readable media (e.g., computer-readable media) are disclosed for providing a graphical representation of elements.

Figure 1:
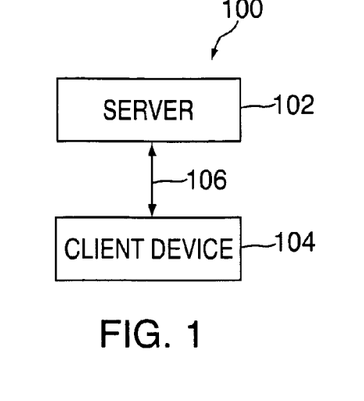
FIG. 1 is a schematic view of a client-server data system configured in accordance with an embodiment of the invention.

FIG. 1 is a schematic view of illustrative client-server data system 100 configured in accordance with the principles of the invention. Data system 100 can include server 102 and client device 104. In some embodiments, data system 100 can include multiple servers 102, multiple client devices 104, or both multiple servers 102 and multiple client devices 104. To prevent overcomplicating the drawing, only one server 102 and one client device 104 are illustrated.

Server 102 may include any suitable types of servers that can store and provide data to client device 104 (e.g., file server, database server, web server, or media server). Server 102 can store media and other data (e.g., metadata associated with the media), and server 102 can receive data download requests from client device 104. For example, server 102 can receive requests to obtain music elements, such as one or more songs. Responsive thereto, server 102 can locate and provide the requested songs as well as metadata associated with the songs (e.g., genre, artist, album, album cover art, release date, bits per minute (BPM) information, producer, song writer, keywords, tags, lyrics, vocals, bass line information).

In some embodiments, server 102 can obtain and process data from one or more client devices 104. For example, server 102 can collect information on playlists of songs created by users of various client devices 104. Using the collected information, server 102 can determine which songs are commonly grouped or played with one another. Upon request by a particular client device 104, server 102 can use this information to create music groups from the songs stored on the particular client device 104. Server 102 can provide the created music groups to client device 104.

For example, server 102 can create each music group by using one song stored on client device 104 as a seed to identify other similar or related songs stored on client device 104. For example, server 102 can use information about the seed song collected from multiple client devices 104 to determine other songs that are commonly grouped with the seed song. Accordingly, this song-grouping feature may sometimes be referred to as a "seed-based clustering" feature. In some embodiments, server 102 can use a seed other than a song to identify a music group. Server 102 may seed the seed-based clustering feature using, for example, one or more attributes of a song, such as the genre, artist, album, album cover art, release date, BPM information, producer, song writer, keywords, tags, lyrics, vocals, bass line information. In these embodiments, server 102 can use any suitable approach to create a music group based on the attribute. For example, server 102 can identify songs stored on that client device 104 that have the same or a similar/related attribute, or server 102 can use the song as a seed and eliminate any identified songs that do not have a compatible attribute.

Server 102 can communicate with client device 104 over communications link 106. Communications link 106 can include any suitable wired or wireless communications link, or combinations thereof, by which data may be exchanged between server 102 and client 104. For example, communications link 106 can include a satellite link, a fiber-optic link, a cable link, an Internet link, or any other suitable wired or wireless link. Communications link 106 may enable data transmission using any suitable communications protocol supported by the medium of communications link 106. Such communications protocols may include, for example, Wi-Fi (e.g., a 802.11 protocol), Ethernet, Bluetooth (registered trademark), radio frequency systems (e.g., 900 MHz, 2.4 GHz, and 5.6 GHz communication systems), infrared, TCP/IP (e.g., and the protocols used in each of the TCP/IP layers), HTTP, BitTorrent, FTP, RTP, RTSP, SSH, any other communications protocol, or any combination thereof.

Client device 104 can include any electronic device capable of providing a graphical representation of elements, such as a graphical representation of songs. Client device 104 may be operative to communicate with server 102. For example, client device 104 can include a portable media player (e.g., an iPod), a cellular telephone (e.g., an iPhone), pocket-sized personal computers, a personal digital assistance (PDA), a desktop computer, a laptop computer, and any other device capable of communicating via wires or wirelessly (with or without the aid of a wireless enabling accessory device).

Figure 2:
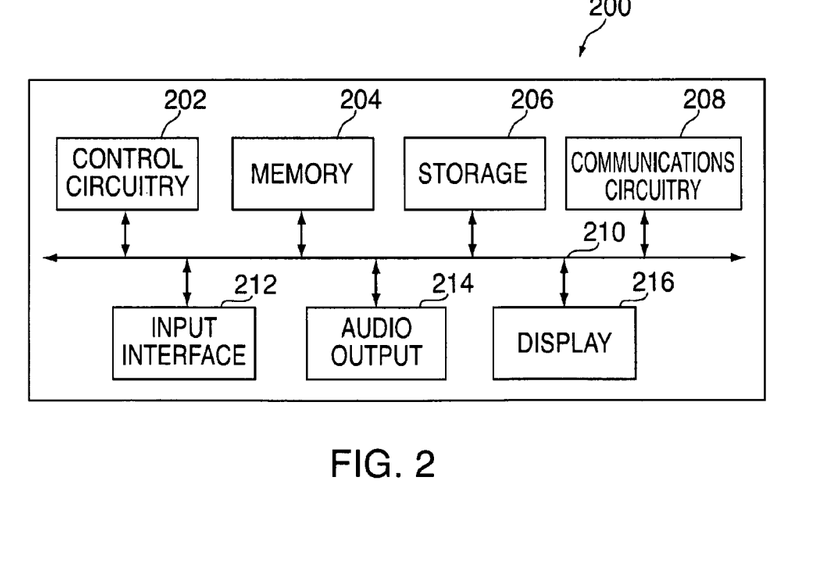
FIG. 2 is a schematic view of an electronic device configured in accordance with an embodiment of the invention.

Referring now to FIG. 2, a schematic view of illustrative electronic device 200 is shown. Electronic device 200 can be a device that is the same or similar to client device 104 (FIG. 1), or can be a device not operative to communicate with a server. Electronic device 200 can include control circuitry 202, memory 204, storage 206, communications circuitry 208, bus 210, input interface 212, audio output 214, and display 216. Electronic device 200 can include other components not shown in FIG. 2, such as a power supply for providing power to the components of electronic device. Also, while only one of each component is illustrated, electronic device 200 can include more than one of some or all of the components.

Control circuitry 202 can control the operation and various functions of device 200. For example, control circuitry 202 can identify songs to recommend or display to a user, and can direct display 216 to display representations of the identified songs. As described in detail below, control circuitry 202 can control the components of electronic device 200 to provide a graphical representation of songs or other elements that have similar attributes. Control circuitry 202 can include any components, circuitry, or logic operative to drive the functionality of electronic device 200. For example, control circuitry 202 can include one or more processors acting under the control of an application.

In some embodiments, the application can be stored in memory 204. Memory 204 can include cache memory, Flash memory, read only memory (ROM), random access memory (RAM), or any other suitable type of memory. In some embodiments, memory 204 can be dedicated specifically to storing firmware for control circuitry 202. For example, memory 204 can store firmware for device applications (e.g., operating system, user interface functions, and other processor functions).

In some embodiments, storage 206 can be any suitable type of storage medium offering permanent or semi-permanent memory. For example, storage 206 can include one or more storage mediums, including for example, a hard drive, Flash, or other EPROM or EEPROM. Storage 206 can be used by electronic device 200 to store music, such as a collection of songs, and other media and electronic files (e.g., text-based files, pictures or graphics). Storage 206 can store information or metadata associated with the media, such as user-generated or automatically-created playlists, seed-generated music group information, genre, artist, album, album cover art, date, BPM, lyrics, vocals information, bass line information, or any other suitable information for each stored song. In some embodiments, the media and associated information can be obtained from a server, such as server 102 of FIG. 1. Storage 206 can also store any other suitable information, such as preference information (e.g., music playback preferences), lifestyle information, exercise information (e.g., obtained from exercise monitoring system), transaction information (e.g., credit card information), subscription information (e.g., for podcasts or television shows), and telephone information (e.g., an address book).

Communications circuitry 208 can enable electronic device 200 to communicate with other devices, such as to a server (e.g., server 102 of FIG. 1). For example, communications circuitry 208 can include Wi-Fi enabling circuitry that permits wireless communication according to one of the 802.11 standards or a private network. Other wired or wireless protocol standards, such as Bluetooth, can be used in addition or instead.

Input interface 212, audio output 214, and display 216 can provide a user interface for a user to interact with electronic device 200. Input interface 212 may enable a user to provide inputs and feedback to electronic device 200. Input interface 212 can take any of a variety of forms, such as one or more of a button, keypad (e.g., computer keyboard), dial, click wheel, touch screen, or accelerometer. Audio output 214 provides an interface by which electronic device 200 can provide music and other audio elements to a user. Audio output 214 can include any type of speaker, such as computer speakers or headphones. Display 216 can present visual media (e.g., graphics such as album cover, text, and video) to the user. Display 216 can include, for example, a liquid crystal display (LCD), a touchscreen display, or any other type of display.

Figure 3:
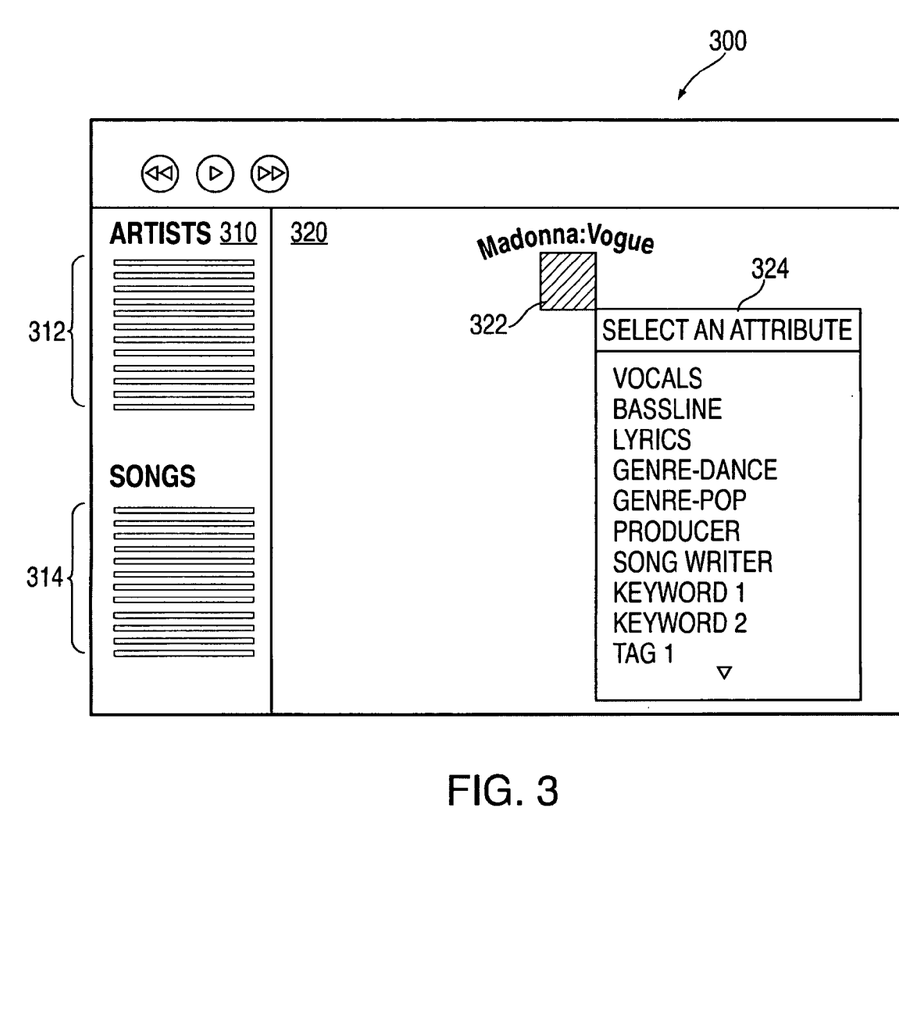
FIG. 3 is an illustrative display screen for providing a user with the ability to define initial parameters for a search in accordance with an embodiment of the invention.
Figure 4:
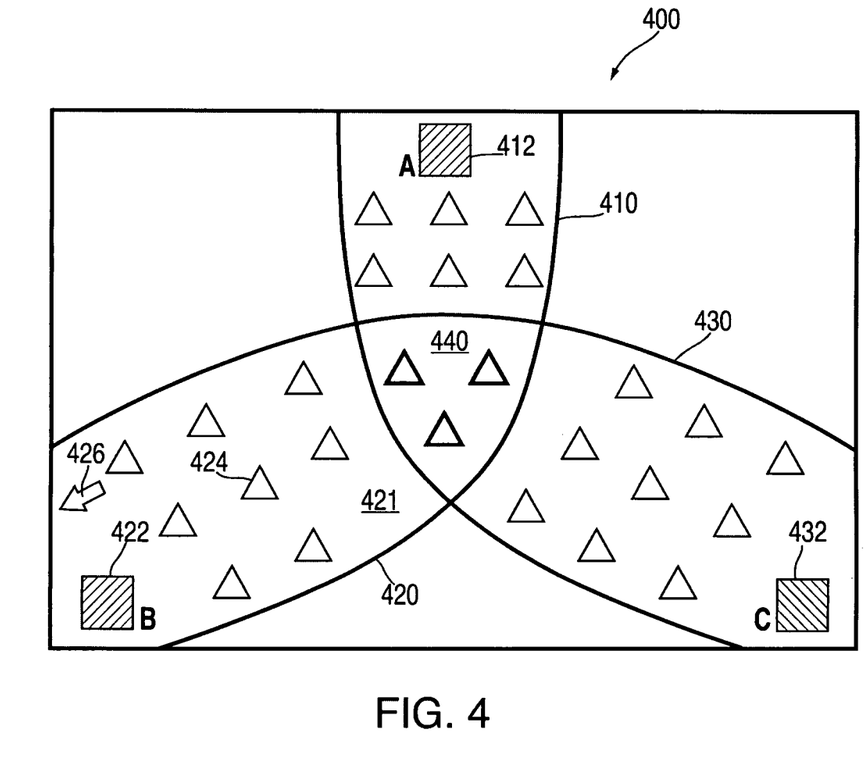
FIGS. 4 and 5 are illustrative display screens showing graphical representations of elements identified in a search in accordance with various embodiments of the invention.
Figure 5:
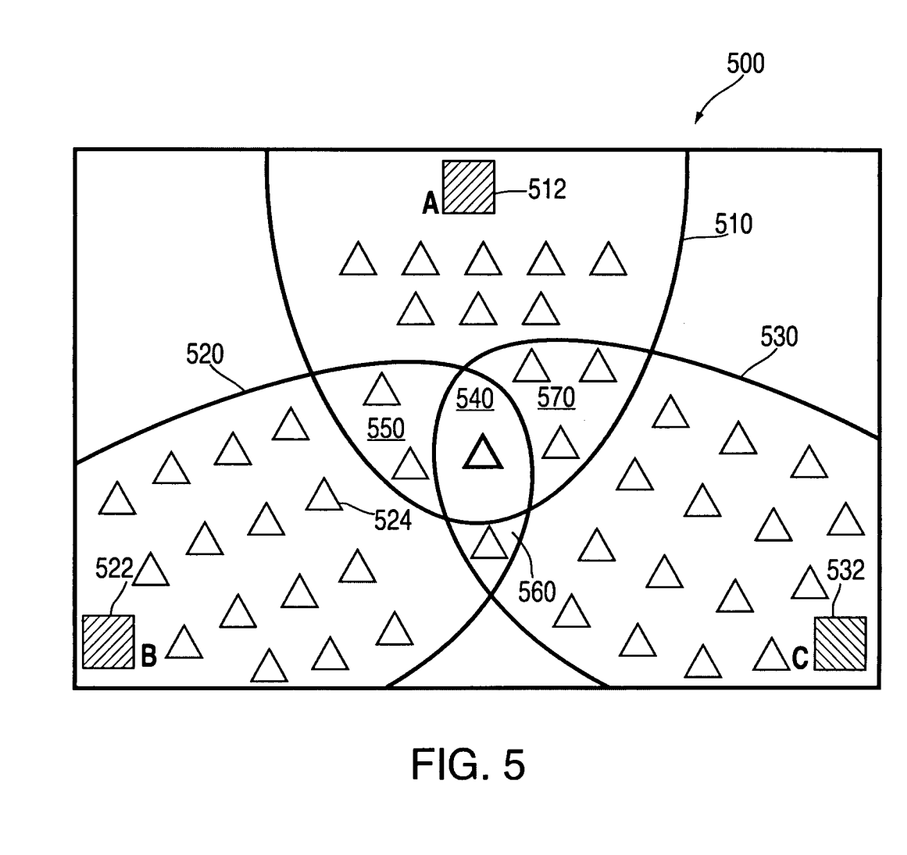

Electronic device 200 can provide, using display 216, a graphical representation of songs that the user might currently be interested in. To identify the songs, the user can initiate a search using a number of initial parameters. Responsive to the user initiation, electronic device 200 can identify a subset of the songs stored in electronic device 200 and provide the graphical representation of the identified songs. The initial parameters may each be, for example, an attribute (e.g., genre, artist, album, album cover art, release date, BPM information, producer, song writer, keywords, tags, lyrics, vocals, bass line information) of a song stored in storage 206. FIG. 3 illustrates a display screen that may be provided by electronic device 200 to enable a user to define the initial parameters, and FIGS. 4 and 5 illustrate resulting display screens with a graphical representation of the search results. Accordingly, the display screens of FIGS. 3-5 will be described with continued reference to electronic device 200 and its components.

Referring first to FIG. 3, an illustrative display screen can be provided by an embodiment of electronic device 200, which allows a user to define the initial parameters. Display screen 300 can include media navigation panel 310 and main media panel 320. Media navigation panel 310 can provide information associated with songs stored on electronic device 200. For example, media navigation panel 310 can include list 312 containing the names of artists and list 314 containing the titles of songs stored in device 200. In some embodiments, electronic device 200 can provide other lists or other information in media navigation panel 310 in addition to or instead of artists list 312 and song list 314.

Each element listed in media navigation panel 310 can be moved or copied onto main media panel 320 by the user using, for example, a drag-and-drop technique (e.g., using input interface 212 of FIG. 2). This allows a user to select those elements currently of interest to the user. Responsive to a user input to "drop" a particular element, electronic device 200 can provide a graphic (e.g., a box or rectangular) for the selected element at the dropped location. In the example of FIG. 3, electronic device 200 can provide box 322 representing the song, Vogue, by Madonna, in response to a user input to drag and drop that song from song list 314. If the user had instead dragged the artist Madonna from artist list 312, box 322 could represent the artist instead of a particular song.

The user can define the reason why a particular element has been dragged onto main media panel 320. In some embodiments, electronic device 200 can provide a list of attributes associated with the element when the element's box is selected from main media panel 320. For example, in response to a user selection of box 322, electronic device 200 may provide pop-up menu 324 listing a variety of different attributes associated with Madonna's Vogue (e.g., the vocals, bass line, lyrics, genre(s), keyword(s), tag(s), and producer (s), and song writer(s) associated with the song). Each of the attributes may be a selectable option, allowing the user to select a particular attribute that the user likes about the song or element. For example, if the user enjoys Madonna's Vogue because of its vocals, the user can select the vocals option from pop-up menu 324.

Electronic device 200 may provide a graphic, which may or may not be similar to graphic 322, for each element that the user selects from media navigation panel 312. The user can drag any suitable number of songs (or other elements) onto main media panel 320. For each of these element, the user can select any attribute associated with that element regardless of what attributes have been selected for the other elements. For example, a user selection of vocals for box 322 may not limit which attributes are presented to the user for other elements. This way, electronic device 200 allows the user to give a particular reason (by way of its attribute) for why the user likes each selected element, even if some or all of the reasons are different. Also, each of the songs can be positioned at any suitable location on main media panel 320 requested by the user (e.g., using a drag-and-drop) so that the user can personalize the display of attributes. This allows the user to determine, for example, the absolute position of each song on main media panel 320 and the relative position of each attribute with respect to the other elements.

Once a user is finished selecting elements and positioning and defining their attributes, the user can initiate a search. For example, to initiate the search, the user can select a search option on display screen 300 (not shown) or push a specific button on electronic device 200. The search can identify songs based on the initial parameters selected by the user, and electronic device 200 can provide a graphical representation of some or all of the identified songs. The user can select one or more of the identified songs from the graphical representation to, for example, view additional information about the selected song (e.g., artist or album information), play the selected songs, or create a playlist using the selected songs.

FIG. 4 illustrates a display screen 400 that may be provided by electronic device 200 responsive to a user initiation of a search. Display screen 400 may be provided, for example, in main media panel 320 of FIG. 3. In the example of FIG. 4, electronic device 200 can provide display screen 400 responsive to a search conducted using three initial parameters selected by a user. In one operating scenario, one of these initial parameters can be the "vocals" attribute of "Madonna's Vogue" selected in the manner described above in connection with FIG. 3. For simplicity, and as shown in FIG. 4, the initial parameters may be referred to as Attribute A, Attribute B, and Attribute C. These initial parameters can be represented by boxes 412, 422, and 432, respectively. In some embodiments, electronic device 200 can display textual information alongside boxes 412, 422, and 432 that indicates their respective attributes.

In some embodiments, electronic device 200 can reposition boxes 412, 422, and 432 responsive to a user input to initialize a search. For example, electronic device 200 can distribute boxes 412, 422, and 432 relatively far away from one another and each proximate to an edge or corner of display screen 400. In other embodiments, electronic device 200 can maintain the absolute position of each box selected or dropped according to, for example, the drag-and-drop technique discussed above.

Upon initiation of a search using these attributes, electronic device 200 can provide a graphical representation of elements (e.g., songs) that are similar to, compatible with, or related to at least one of the attributes. More particularly, electronic device 200 can perform a search to identify a first group of songs compatible with Attribute A, a second group of songs compatible with Attribute B, and a third group of songs compatible with Attribute C. Electronic device 200 can identify these songs with or without the aid of a server, such as server 102 of FIG. 1. For example, in some embodiments, electronic device 200 can identify the songs in each group by seeding the seed-based clustering feature implemented on server 102 with Attribute A, B, or C. In other embodiments, the electronic device 200 can identify the songs in each group by identifying all songs stored on electronic device 200 having Attribute A, B, or C. For example, if Attribute A is a particular genre, electronic device 200 can identify all songs having that particular genre.

The songs or other type of elements identified in the search can be represented as graphics, such as graphic 424, which can be distributed across display screen 400. While FIG. 4 shows these graphics as triangles, electronic device 200 can provide any graphics of any suitable shape and size, and of any type (e.g., album cover art, picture or thumbnail of the artist). The graphic can include or be limited to textual information related to the element, such as song name, artist name, album name, release date, or any combination thereof. For simplicity, rather than distinguishing between an "element" and the "graphic" that is displayed to represent that element, a graphic may sometimes be referred to (where appropriate) by its corresponding element. For example, "displaying an element" should be understood to mean "displaying a graphic associated with an element," and therefore graphic 424 may hereinafter be referred to as element 424.

Electronic device 200 can position the elements, including element 424, based on whether the element is associated with Attribute A, B, or C. Display screen 400 can include three regions 410, 420, and 430 that are respectively associated with Attributes A, B, and C and encompass their respective boxes 412, 422, and 432. Electronic device 200 can display elements associated with Attribute A in region 410, elements associated with Attribute B (including element 424) in region 420, and elements associated with Attribute C in region 430. While the outline of each region is depicted in FIG. 4, in some embodiments, the outlines of the regions are not displayed. Instead, a user can decipher which region an element belongs in based on its location in display screen 400 or its proximity to box 412, 422, or 432.

Looking to region 420, the elements associated with Attribute B may be distributed within region 420 (which includes sub-region 421 and central sub-region 440) based on how similar or compatible each element is to the other attributes (here, Attributes A and C). For example, compared to the position of element 424, electronic device 200 can display elements more compatible with Attributes A and C closer to the center of display screen 400 (and further from box 422) and can display elements less compatible with Attributes A and C further from the center of display screen 400 (and closer to box 422).

To determine the compatibility of each element with Attributes A and C, electronic device 200 (or optionally server 102 of FIG. 1) can compute a weight for that element. The weight can be numerical, where a higher number indicates that the element is more compatible with or similar/related to the other attributes defined by the user. For example, the weight of an element might be between 0 and 100, and element 424 may have a relatively large weight (e.g., between 80 and 100) if the element is highly compatible with Attributes A and C. Thus, electronic device 200 can place an element within its corresponding region in display screen 400 based on the element's computed weight. For example, electronic device 200 can use the weight of element 424 to determine how far away from box 422 to place element 424, or equivalently, can use the weight of element 424 to determine how close to the center of display screen 400 to place element 424. A process that electronic device 200 may execute to compute and utilize the weights will be described in detail below in connection with FIG. 8.

With continued reference to region 420, electronic device 200 can use an element's weight to determine whether to place an element within sub-region 421 or sub-region 440. As illustrated in FIG. 4, sub-region 440 may be a centrally-located sub-region that overlaps with the regions associated with Attributes A and C. Electronic device 200 can therefore place elements associated with Attribute B that are highly compatible with Attributes A and C into central sub-region 440. For example, electronic device 200 can place elements within sub-region 440 if their weights are above a predetermined threshold or within a sufficiently high, predetermined range (e.g., a weight between 80 and 100 for weights ranging from 0 to 100). In other embodiments, electronic device 200 may compute a binary measure to determine whether to place an element in sub-region 440 or somewhere within sub-region 421. For example, rather than computing a weight with a varying range, electronic device 200 can compute, for each element, whether that element is (or is not) also associated with Attributes A and C, and can display that element in central sub-region 440 or at any suitable location in sub-region 421 based on the determination.

Electronic device 200 can use the same or a similar approach as with the elements of Attribute B to distribute elements associated with Attribute A within region 410 and to distribute elements associated with Attribute C within region 430. Thus, the elements displayed in central sub-region 440 may also include elements associated with Attribute A that are highly compatible with Attributes B and C, as well as elements associated with Attribute C that are highly compatible with Attributes A and B. In some embodiments, the elements displayed in central sub-region 440 may be elements that are identified by the search as being associated with all three elements (e.g., songs that can be identified using a seed-based clustering feature using any of the three attributes as a seed).

In some embodiments, electronic device 200 can "highlight" or visually distinguish the elements in central sub-region 440 from elements not displayed in central sub-region 440. For example, in FIG. 4, the outlines of the elements in sub-region 440 are shown to be bolder than those outside of sub-region 440. In other embodiments, electronic device 200 can use any other technique to visually distinguish the elements in sub-region 440 from other elements, such as using a different color, pattern, shape, or size. By highlighting the elements in central sub-region 440, these elements may be more prominent to a user operating device 200, allowing the user to easily identify which elements substantially satisfy or are compatible with all of the initial parameters defined by the user.

In other embodiments, electronic device 200 can visually distinguish elements using a more gradual approach. In other words, rather than highlighting (or not highlighting) elements based on whether an element is within central sub-region 440, electronic device 200 can provide a gradient, where elements closer to the center of display screen 400 are more highlighted than those further from the center. Electronic device 200 can use, for example, color, size, opacity, or another characteristic to provide this gradient. Thus, in these embodiments, electronic device 200 can use the weight associated with each element to determine not only the position of the element, but its color, size, opacity, or other characteristic. This may cause display screen 400 to appear three-dimensional (e.g., spherical), where higher-weight elements appear closer to the user and have a greater value in the third dimension.

Figure 6:
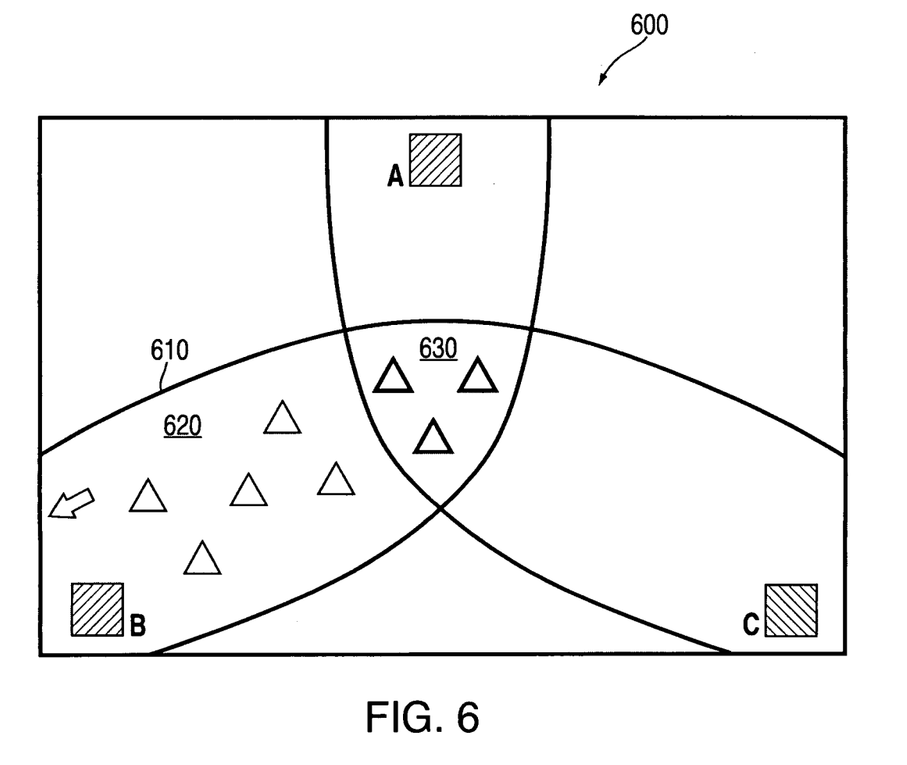
FIGS. 6 and 7 are display screens illustrating in accordance with an embodiment of the invention.
Figure 7:
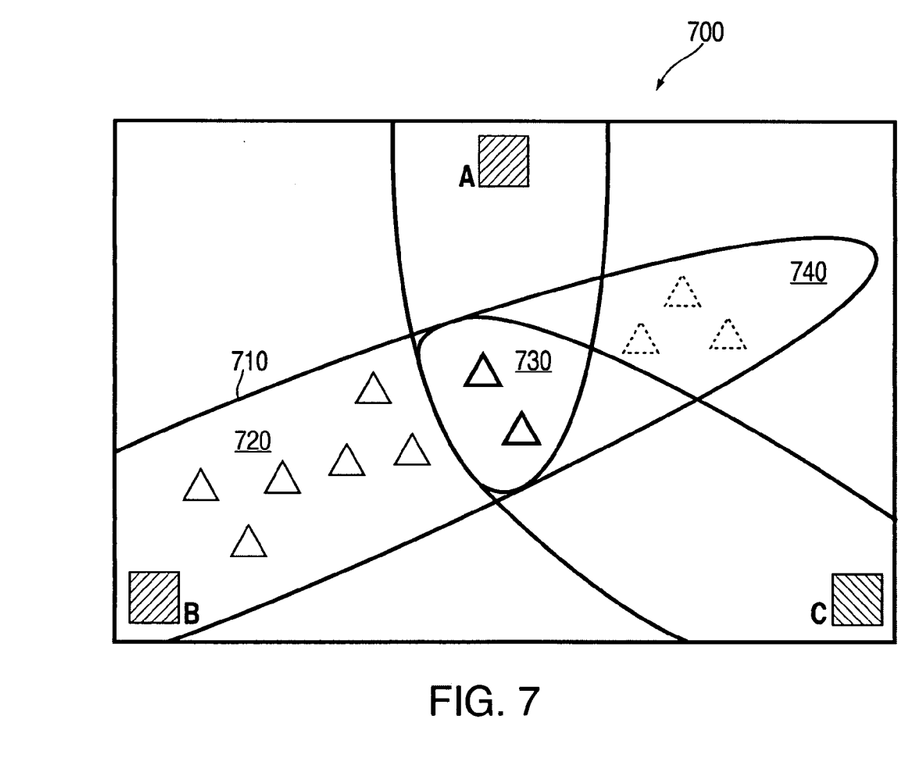

Electronic device 200 may allow a user to rotate the three-dimensional graphical representation using, for example, a flicking motion on a multi-touch touch screen. This may cause a change in the perspective so that the user can focus more on the elements associated with a subset of the attributes. FIGS. 6 and 7 illustrate a technique that electronic device 200 may use to change the perspective of the elements associated with one attribute, although the general technique may be applied to achieve a general rotation of all elements.

Electronic device 200 may not display all elements identified by the seed-based clustering feature (or other searching or element-identification technique). In some embodiments, electronic device 200 may display a maximum number of elements in each region or sub-region to prevent from cluttering display screen 400. In other embodiments, electronic device 200 may display only those elements that have weights greater than a minimum threshold (e.g., 50 for weights ranging from 0 to 100). The elements below this minimum threshold may effectively be positioned so far from the center of display screen 400 that they are completely off the screen. Electronic device 200 can display arrow 426 to indicate that additional elements associated with Attribute B have been identified but are "off of the screen." Electronic device 200 can enable the user to view the additional elements by changing the perspective of display screen 400 or by moving just region 410 in an up-right direction to expose more of region 420. This latter feature will be described in greater detail below in connection with FIGS. 6, 7, and 10.

Electronic device 200 can provide display screen 400 by using a single measure or "weight" to determine the location of each element. This may provide electronic device 200 with enough information to determine how far from a box (e.g., box 422) to display an element (e.g., element 424), but by itself might not be sufficient to determine an angle from the box from which to display the element. Thus, in some embodiments, electronic device 200 can use multiple weights (e.g., one weight per attribute) to determine each elements' location on a display screen, which may enable electronic device 200 to determine both a magnitude and angle for each element. Such an embodiment is illustrated in FIG. 5.

FIG. 5 shows another embodiment of a display screen that can be provided by electronic device 200 responsive to a search requested by the user. More particularly, display screen 500 shows another graphical representation of elements (e.g., songs) returned by the search, where each element is associated with Attribute A, B, or C, or a combination thereof. Display screen 500 can include any of the features described above in connection with FIG. 4, except that electronic device 200 positions an element associated with Attribute B (for example) based not on its overall compatibility or weight with Attributes A and C, but based on how compatible the element is with Attributes A and C individually (or with respect to each other).

For clarity, the overall compatibility of an element to multiple attributes may be referred to as a "weight," while the compatibility of an element to a single attribute may be referred to as a "degree of relevancy." In some embodiments, the "weight" of an element can be computed based on multiple "degrees of relevancy." As described above, the "degree of relevancy" of a particular element with respect to a particular attribute can refer to a non-binary measure of how compatible with, similar to, or related that particular element is to the particular attribute. The measure is non-binary in that the degree of relevancy indicates not only whether the element is or is not compatible with an attribute, but indicates how compatible the element is to the attribute. In some embodiments, the degree of relevancy can be a number between 1 and 10, where a number closer to 10 represents a greater compatibility or similarity. For example, if Attribute C is the "classical genre," elements that are also in the classical genre may have a degree of relevancy of 10, elements that are highly dissimilar to classical music, such as electronic music, can have a degree of relevancy of 1, and other elements can have degrees of relevancy between these extremes (e.g., 3 for pop music, 6 for music with acoustic guitar).

Like in display screen 400 (FIG. 4), display screen 500 can include three regions 510, 520, and 530 that are respectively associated with Attributes A, B, and C. These regions may overlap to form central sub-region 540 (which overlaps all three regions) and sub-regions 550, 560, and 570 (which each overlap two regions). For simplicity, the distribution of elements within a region (and its sub-regions) may sometimes be described with reference to region 520 of Attribute B. However, it should be understood that this description can be adapted easily to apply to the elements associated with Attributes A and C.

For each element associated with Attribute B, electronic device 200 can use the degrees of relevancy with respect to Attribute A and with respect to Attribute C to determine the placement of the element. For example, if element 524 is equally compatible with both attributes (e.g., degrees of relevancy of 5 for both Attribute A and C), elements that are more compatible with Attribute A than C can be displayed at an angle directed more towards box 512, and elements that are more compatible with Attribute C than A can be displayed at an angle directed more towards box 532 than box 512. This way, elements that are highly compatible with Attribute A (e.g., degree of relevancy between 8 and 10) but not with C can be angled such that the elements are displayed in sub-region 550 and elements that are highly compatible with Attribute C but not A can be angled such that elements are displayed in sub-region 560. Elements highly compatible with both attributes can be displayed within central 540.

Overall, sub-region 550 can include elements associated with Attribute B that have a high degree of relevancy with respect to A but not C, as well as elements associated with Attribute A that have a high degree of relevancy with respect to B but not C. In other embodiments, the elements in sub-region 550 can include elements that are returned from a search using either Attribute A or B, but not C, as an initial parameter (e.g., using Attribute A or B as a seed to the seed-based clustering feature). The elements of sub-regions 560 and 570 can have similar features.

In some embodiments, for each element associated with Attribute B, electronic device 200 can use the degrees of relevancy with respect to Attribute A, B, and C (instead of just A and C) to determine the element's placement in region 520. This may involve displaying each element in a spatial position relative to boxes 512, 522, and 532 based on the three degrees of relevancy. For example, electronic device 200 can determine where to display an element relative to boxes 512, 522, and 532 by balancing its computed degrees of relevancy, such as by using a center of mass approach. In particular, electronic device 200 can assign a mass to each of boxes 512, 522, and 524 based on the corresponding degree of relevancy so that the most compatible attribute has the "heaviest" box. Electronic device 200 can then find the location on the display screen 500 corresponding to the center of the three masses, which electronic device 200 can use as the approximate location for the element.

As illustrated in FIG. 5, electronic device 200 may provide a highlighted element for any of the elements in sub-region 540. In other embodiments, electronic device 200 can provide highlighted elements in one of more of the other sub-regions 550, 560, and 570 in addition to or instead of sub-region 540. For example, electronic device 200 can display bold elements in sub-regions 550, 560, and 570, and display even bolder elements in central sub-region 540.

In some embodiments, the user can change the distribution of the elements displayed in display screens 400 or 500. For example, the user may not be interested in the highlighted elements, or may be finished selecting or listening to the elements associated with highlighted elements. In this scenario, the user may want to change the elements that are displayed in central sub-region 440 (FIG. 4) or central sub-region 540 (FIG. 5).

It should be understood that any of the features described in connection with FIG. 4 can apply to FIG. 5, and vice versa. For example, in some embodiments, display screen 500 of FIG. 5 can place elements that were identified in more than one of the searches within sub-regions 540, 550, 560, and 570, and can use only weights (but not individual degrees of relevancy) to determine the location of the remaining elements.

FIGS. 6 and 7 are display screens that illustrate one way in which electronic device 200 (FIG. 2) can allow a user to change the distribution of the elements on a display screen. While FIGS. 6 and 7 will be described using embodiments that place elements based on weight, it should be understood that the technique can be adapted for use in embodiments that place elements based on individual degrees of relevancy.

Turning first to FIG. 6, display screen 600 is shown of a graphical representation of elements (e.g., songs). Display screens 600 may be similar to display screen 400 (FIG. 4) and can have any of the features and functionalities described above in connection with FIG. 4. Elements can be displayed in any of the regions shown in FIG. 4. However, to prevent from overcomplicating the figure, elements are only depicted in region 610 (including sub-regions 620 and 630) which is associated with Attribute B.

The user can move any one of the regions on display screen 600 to change the distribution of elements. This provides the user with the ability to determine which attribute (A, B, or C) is most important to the user. For example, if the user determines that he or she is most interested in Attribute B, the user can request that region 610 be moved towards the upper right of display screen 600, which causes electronic device 200 to display and highlight different elements associated with Attribute B in central sub-region 630. For example, if input interface 212 (FIG. 2) is a touch screen, the user can request display of different elements associated with Attribute B by dragging region 610 towards the upper-right of display screen 600.

FIG. 7 illustrates a display screen that can be provided by electronic device 200 (FIG. 2) responsive to a user request to move region 610 (FIG. 6). In particular, responsive to the user request, electronic device 200 can provide region 710, which may be associated with Attribute B and appear expanded or displaced compared to region 610. Region 710 can include a third sub-region 740. The three elements displayed in sub-region 740 may correspond to elements that have been "pushed out" of the central sub-region 630 (FIG. 6) due to the user's request to move region 610. As illustrated in FIG. 7, these pushed-out elements may be displayed with low opacity (that is, semi-transparent). This way, because these elements have already been presented for the user's consideration, the elements may be displayed in a manner that does not draw the user's attention. Electronic device 200 can use any technique, including adjusting the opacity, to provide a less-prominent element. For example, electronic device 200 can provided the element in dotted lines, decrease the thickness of the lines, or provide the element in black-and-white instead of in color.

In other embodiments, electronic device 200 might not display the elements in sub-region 740 at all. In still other embodiments where a three-dimensional graphical representation is provided, elements in sub-region 740 may be displayed according to a gradient of decreasing or changing color, size, opacity, perspective, or other characteristic. This may give the elements in sub-region 740 an appearance of curving away from the user. Thus, starting from elements closest to the box, sub-region 720 may appear to curve towards the user, peaking at central sub-region 730, and curving away again in sub-region 740.

With the elements of sub-region 630 (FIG. 6) "pushed out" from central sub-region 730, electronic device 200 can provide other elements within central sub-region 730. The elements in sub-region 730 may previously have been located in sub-region 620 (FIG. 6) near the boundary between sub-region 620 and central sub-region 630. Thus, electronic device 200 can provide highlighted elements for the next set of elements associated with Attribute B that are most compatible with Attributes A and C (e.g., based on weight). Also, by moving the elements displayed in display screen 600 towards the upper-right corner, additional room on display screen 700 may be made for elements associated with Attribute B (e.g., near the bottom-left corner of display screen 700). Responsive to the user's request to move region 610 (FIG. 6), electronic device 200 can display additional elements near the bottom-left corner of sub-region 720 that were previously determined to be too dissimilar to Attributes A and C for display in display screen 600 (e.g., based on weight).

To effect the movement of region 610 (FIG. 6) requested by the user, electronic device 200 can adjust the weight for each element associated with Attribute B. For example, each element can be positioned on display screen 600 based on an initial weight. Responsive to the request to move region 610 (FIG. 6) in an up-right direction, electronic device 200 can increase the weight of each element associated with Attribute B by a factor. The size of the factor can be based on the amount of movement requested by the user (e.g., a larger movement results in a greater factor). Electronic device 200 may update the location of each element based on the increased weight. For some elements, the increase in weight may be sufficient to move the elements from one sub-region to another. For example, if each element has an initial weight that is less than or equal to 100, the sub-regions of FIGS. 6 and 7 may be divided based on the ranges of Table 1 below:

TABLE 1

| Element Location | Weight range |
| --- | --- |
| Not displayed (or "Off the screen") | ≤50 |
| Sub-region 620/720 | 50-79 |
| Sub-region 630/730 | 80-100 |
| Sub-region 740 | ≥100 |

Therefore, the increase in the initial weight of some elements might change the elements' sub-region or move an element that is "off the screen" onto display screen 700.

It should be understood that the example of FIGS. 6 and 7 are merely illustrative. Electronic device 200 may allow the user to move any of the regions in FIG. 6 or FIG. 7, and not just the region associated with Attribute B. The user may move one, multiple, or all of the regions in any order desired by the user. Also, in some embodiments, the user may move any of the regions towards the edge of the display screen to decrease the weight of each element by a factor. In still other embodiments, electronic device 200 can change the location of an element based on both the amount of requested movement and the angle of requested movement. This may be particularly advantageous for display screens similar to display screen 500 (FIG. 5), which position elements based on the degrees of relevancy. For example, the angle of requested movement can be used to determine which degrees of relevancy to adjust.

Figure 8:
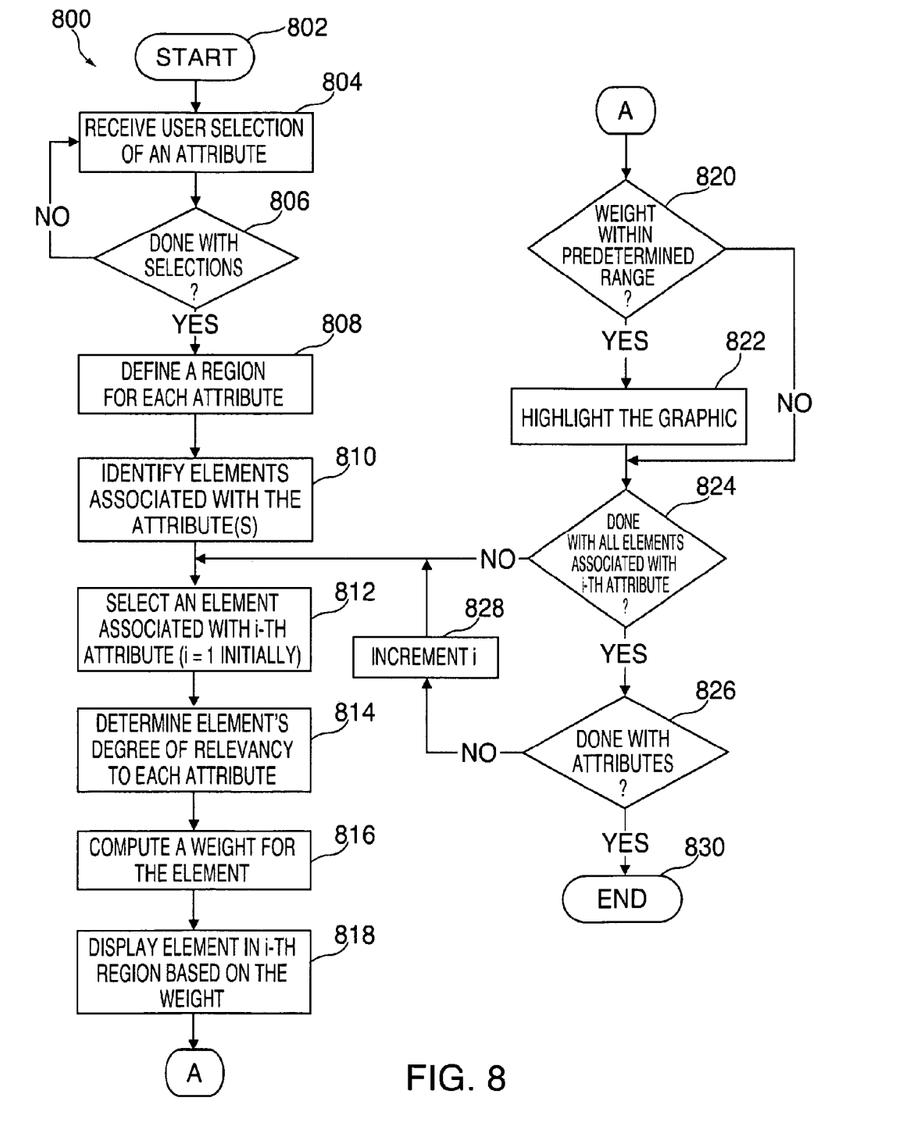
FIG. 8 is a flowchart of an illustrative process for providing a graphical representation of elements in accordance with an embodiment of the invention.
Figure 9:
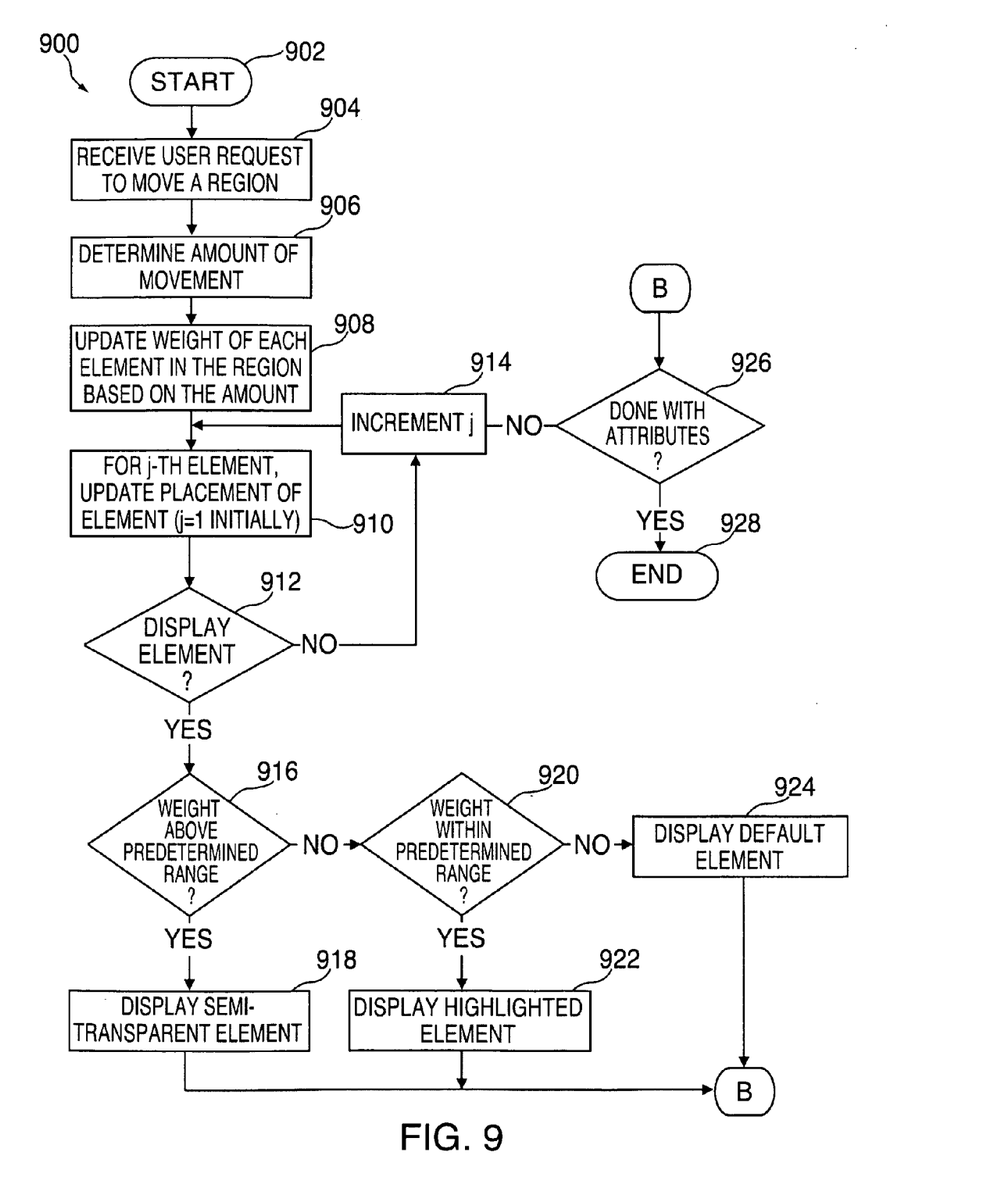
FIG. 9 is a flowchart of an illustrative process for changing the distribution of the elements in a graphical representation of the elements in accordance with an embodiment of the invention.

FIGS. 8 and 9 are illustrative processes that can be executed by an electronic device configured in accordance with various embodiments of the invention. For example, the processes may be executed by electronic device 200 of FIG. 2 to produce the display screens of FIGS. 4, 6, and 7. It should be understood that the processes are merely illustrative. Any steps in these flowcharts may be modified, removed, or combined, and any steps may be added, without departing from the scope of the invention. For example, some of the steps may be modified such that the electronic device can produce the display screen of FIG. 5.

Referring first to FIG. 8, a flowchart of illustrative process 800 is shown for providing a graphical representation of elements (e.g., songs). Process 800 can begin at step 802. Then, at step 804, the electronic device can receive a user selection of an attribute. The attribute may be a genre, artist, album, release date, download/purchase date, the lyrics, BPM information, vocals information, bass line information, guitar information, or keyword/tag information associated with a particular song.

Process 800 can continue to step 806, where the electronic device can determine whether the user is finished making attribute selections. For example, the electronic device can determine that the user is finished when the user requests a search based on the selected attributes to be performed. If the user is not done making selections, process 800 can return to step 804 to receive another user selection of an attribute. Otherwise, process 800 can continue to step 808. At step 808, the electronic device can define a region on a display screen for each of the selected attributes. The regions may be similar to those shown in FIG. 4 or 5.

Then, at step 810, the electronic device can identify elements associated with the attributes previously selected at step 804. The electronic device can identify elements that are associated with at least one of the attributes. For example, the electronic device can use each of the selected attributes as a seed to a seed-based clustering feature implemented on a server (e.g., server 102 of FIG. 1) or the electronic device. Process 800 can then continue to step 812, where the electronic device can select an element associated with a first one of the attributes (e.g., a song identified using the first one of the attributes as a seed).

The electronic device can, at step 814, determine the element's degree of relevancy with respect to each of the attributes. For example, for each attribute, the electronic device can compute or obtain information on how similar or compatible the element is to that attribute. Then, at step 816, the electronic device can compute a weight for the element. In some embodiments, the electronic device can compute the weight based on the degrees of relevancy. For example, the electronic device can add, multiply, or average the degrees of relevancy computed for that element. Using any of these approaches, the weight may be indicative of how similar or compatible the element is to all of the attributes.

Process 800 can continue to step 818. At step 818, the electronic device can display the element in the form of, for example, a graphic. The element may be displayed in the region associated with the first one of the attributes (that is, the attribute corresponding to the element). The electronic device can display the element at a location in the region based on the weight computed at step 816. For example, the electronic device can display the element in a position closer to the center of the display screen if the weight is larger, and may not display the element at all if the weight is below a minimum threshold. In some embodiments, the electronic device can skip step 816, and at step 818, the electronic device can display the element at a location based on the individual degrees of relevancy calculated for the weight. For example, electronic device 200 can determine the location to display the element using a center of mass approach.

Continuing to step 820, the electronic device can determine whether the weight is within a predetermined range. The predetermined range may be a range that captures those elements that are similar or compatible with most or all of the selected attributes. If the electronic device determines that the weight is within the predetermined range, the electronic device can highlight the element associated with the element at step 822. For example, the electronic device can alter or enhance the element such that the element is visually distinguishable from elements associated with weights not within the predetermined range.

After executing step 822, or if the electronic device determines that the weight for the element is not within the predetermined range, process 800 can continue to step 824. At step 824, the electronic device can determine whether elements for all elements associated with the first one of the attributes have been displayed. If not, process 800 can return to step 812 so that the electronic device can display another element associated with the first attribute. If the electronic device determines instead that all elements associated with the first attribute have been displayed, process 800 can continue to step 826.

At step 826, the electronic device can determine whether elements have been displayed for all attributes. If not, process 800 can move to step 828 to enable the electronic device to select elements associated with the next (e.g., the second) attribute. This way, the electronic device can repeat steps 812-822 to display elements in another region that is associated with the next attribute. If the electronic device determines instead that elements have been displayed for all attributes, then all of the elements identified at step 810 have been displayed in the graphical representation (or considered for display). Thus, process 800 can continue to step 830 and end.

Turning now to FIG. 9, a flowchart of illustrative process 900 is shown for changing the distribution of the elements associated with one of the attributes. In some embodiments, the electronic device may execute the steps of process 900 after a graphical representation of elements (e.g., songs) has been created in accordance with the steps of process 800 (FIG. 8). Process 900 begins at step 902. Then, at step 904, the electronic device can receive a user request to move a region. The region may be associated with one of attributes and may contain a number of elements compatible with the attribute. The electronic device can then, at step 906, determine the amount of movement requested by the user.

Continuing to step 908, the electronic device can update the weight for each element associated with attribute. For example, responsive to a user request to move more of the region onto the display screen, the electronic device can increase the weight of each element associated with the attribute. Responsive to a user request to move part of the region off of the display screen, the electronic device can decrease the weight of each element. Then, at step 910, the electronic device can update the placement of an element on the display screen, where the element is associated with a first one of the elements associated with the attribute. The placement can be based, for example, on the updated weight of the element.

Then, at step 912, the electronic device can determine whether to display the element. For example, if the updated weight is lower than the original weight, the placement of the element might be "off" of the screen. If the element is off the screen, the electronic device may not display the element. Instead, process 900 may move to step 914, allowing the electronic device to update the placement of another object at step 910.

Returning to step 912, if the electronic device determines that the element for the element should be displayed, the electronic device can determine at step 916 whether the updated weight is above the predetermined range. In some embodiments, the predetermined range may be the same predetermined range used in the determination of step 820 (FIG. 8). If the updated weight is above the predetermined range, the electronic device can display a semi-transparent element at step 918. Otherwise, if the electronic device determines that the updated weight is within the predetermined range at step 920 (e.g., between 80 and 100), the electronic device can display a highlighted element at step 922. If instead the electronic device determines that the updated weight is below the predetermine range, the electronic device can display the element in a default manner at step 924.

After the electronic device has displayed a semi-transparent, highlighted, or default element, process 900 can continue to step 926. At step 926, the electronic device can determine whether all of the elements associated with the attribute have been updated. If not, process 900 can return to step 914, allowing the electronic device to update the placement of another element at step 910. If instead the electronic device determines that all elements have been updated, process 900 may move to step 928 and end.

The embodiments have been described thus far using songs as an example of elements that can be displayed in the graphical representation. It should be understood that this is merely illustrative and that graphical representations of any other type of electronic files can be presented using any or all of the techniques discussed above. For example, the elements can be pictures taken by various cameras, and the attributes can be selected from one or more of: place (e.g., setting, city, state, or country), event (e.g., vacation), time of day (e.g., morning, evening, breakfast time, lunchtime, dinnertime), people in the picture, date or season of capture, and date of upload. In other embodiments, the elements can be, but are not limited to, videos, text-based files, spreadsheets, presentation files, and webpage files. Also, in some embodiments, different types of files can be displayed on the same screen (e.g., songs and videos).

The described embodiments of the invention are presented for the purpose of illustration and not of limitation, and the invention is only limited by the claims which follow.

What is claimed is:

1. A computer-implemented method, comprising:
   receiving, at a computing device, input corresponding to a selection of one or more initial files from a navigation panel for display in a display panel, wherein each of the one or more initial files includes one or more associated attributes;
   receiving input corresponding to a selection of two or more of the associated attributes included in the selected one or more initial files;
   displaying a graphic for each of the two or more selected attributes in the display panel, wherein when the two or more selected attributes are associated with the same initial file, the displayed position of the graphics is automatically determined;
   analyzing a plurality of additional files to determine whether the plurality of additional files are relevant to the two or more selected attributes;
   determining that a subset of the plurality of additional files are relevant to the two or more selected attributes;
   displaying two or more defined regions corresponding to the two or more selected attributes in the display panel; and
   displaying the subset of the additional files in the two or more defined regions, wherein the relevance of the additional files in the subset to the two or more selected attributes is indicated by the displayed position of the additional files in the subset in the two or more defined regions, and wherein the displayed position of an additional file in the subset in a defined region indicates that the additional file is relevant to each of the two or more selected attributes.

2. The method of claim 1, wherein the defined region is formed by an overlap of the two or more defined regions corresponding to the two or more selected attributes.

3. The method of claim 1, wherein the relevance of the additional files in the subset to the two or more selected attributes is indicated by the proximity of the displayed additional files in the subset to the displayed graphics for the two or more selected attributes.

4. The method of claim 1, further comprising:
assigning a weight to each of the two or more selected attributes.

5. The method of claim 4, further comprising:
receiving input corresponding to modification of a defined region corresponding to a selected attribute of the two or more selected attributes; and
changing the assigned weight of the selected attribute corresponding to the modified defined region.

6. The method of claim 1, wherein the initial files are media files, and wherein the one or more associated attributes are audio, video, or image attributes.

7. A computer-implemented system, comprising:
one or more data processors; and
one or more non-transitory computer-readable storage media containing instructions configured to cause the one or more processors to perform operations including:
receiving input corresponding to a selection of one or more initial files from a navigation panel for display in a display panel, wherein each of the one or more initial files includes one or more associated attributes;
receiving input corresponding to a selection of two or more of the associated attributes included in the selected one or more initial files;
displaying a graphic for each of the two or more selected attributes in the display panel, wherein when the two or more selected attributes are associated with the same initial file, the displayed position of the graphics is automatically determined;
analyzing a plurality of additional files to determine whether the plurality of additional files are relevant to the two or more selected attributes;
determining that a subset of the plurality of additional files are relevant to the two or more selected attributes;
displaying two or more defined regions corresponding to the two or more selected attributes in the display panel; and
displaying the subset of the additional files in the two or more defined regions, wherein the relevance of the additional files in the subset to the two or more selected attributes is indicated by the displayed position of the additional files in the subset in the two or more defined regions, and wherein the displayed position of an additional file in the subset in a defined region indicates that the additional file is relevant to each of the two or more selected attributes.

8. The system of claim 7, wherein the defined region is formed by an overlap of the two or more defined regions corresponding to the two or more selected attributes.

9. The system of claim 7, wherein the relevance of the additional files in the subset to the two or more selected attributes is indicated by the proximity of the displayed additional files in the subset to the displayed graphics for the two or more selected attributes.

10. The system of claim 7, wherein the operations further include:
assigning a weight to each of the two or more selected attributes.

11. The system of claim 10, wherein the operations further include:
receiving input corresponding to modification of a defined region corresponding to a selected attribute of the two or more selected attributes; and
changing the assigned weight of the selected attribute corresponding to the modified defined region.

12. The system of claim 7, wherein the initial files are media files, and wherein the one or more associated attributes are audio, video, or image attributes.

13. A computer-program product, tangibly embodied in a non-transitory machine-readable storage medium, including instructions configured to cause a data processing apparatus to:
receive input corresponding to a selection of one or more initial files from a navigation panel for display in a display panel, wherein each of the one or more initial files includes one or more associated attributes;
receive input corresponding to a selection of two or more of the associated attributes included in the selected one or more initial files;
display a graphic for each of the two or more selected attributes in the display panel, wherein when the two or more selected attributes are associated with the same initial file, the displayed position of the graphics is automatically determined;
analyze a plurality of additional files to determine whether the plurality of additional files are relevant to the two or more selected attributes;
determine that a subset of the plurality of additional files are relevant to the two or more selected attributes;
display two or more defined regions corresponding to the two or more selected attributes in the display panel; and
display the subset of the additional files in the two or more defined regions, wherein the relevance of the additional files in the subset to the two or more selected attributes is indicated by the displayed position of the additional files in the subset in the two or more defined regions, and wherein the displayed position of an additional file in the subset in a defined region indicates that the additional file is relevant to each of the two or more selected attributes.

14. The computer-program product of claim 13, wherein the defined region is formed by an overlap of the two or more defined regions corresponding to the two or more selected attributes.

15. The computer-program product of claim 13, wherein the relevance of the additional files in the subset to the two or more selected attributes is indicated by the proximity of the displayed additional files in the subset to the displayed graphics for the two or more selected attributes.

16. The computer-program product of claim 13, wherein the instructions are further configured to cause the data processing apparatus to:
assign a weight to each of the two or more selected attributes.

17. The computer-program product of claim 16, wherein the instructions are further configured to cause the data processing apparatus to:
receive input corresponding to modification of a defined region corresponding to a selected attribute of the two or more selected attributes; and
change the assigned weight of the selected attribute corresponding to the modified defined region.

18. The computer-program product of claim 13, wherein the initial files are media files, and wherein the one or more associated attributes are audio, video, or image attributes.

\* \* \* \* \*